3,780,008
IN SITU INITIATOR POLYMERIZATION OF VINYL CHLORIDE

Edwin Studley Smith, Cuyahoga Falls, and Emmett J. Glazer, Stow, Ohio, assignors to The Goodyear Tire & Rubber Company, Akron, Ohio
No Drawing. Filed Dec. 6, 1971, Ser. No. 205,363
Int. Cl. C08f 1/60, 3/30
U.S. Cl. 260—92.8 W    3 Claims

ABSTRACT OF THE DISCLOSURE

Relates to the reduction in time required for the polymerization of vinyl monomer by initiators formed in situ from a component present in less than all of the monomer in the monomer phase reacting with a component present in the water phase.

---

This invention relates to the in situ formation of an initiator for the aqueous polymerization of a polymerizable monomer in a multi-phase polymerization system, at least one phase of which comprises the polymerizable monomer containing one component necessary in the formation of the initiator, the monomer being dispersed as droplets in at least one other phase containing the other component necessary to complete the formation of the initiator wherein the invention resides in reducing the polymerization time needed to form the polymer by concentrating all of the one initiator forming component in less than all of the dispersed polymerizable monomer droplets.

In the in situ polymerization of vinyl monomers as disclosed in U.S. Pat. 3,022,281, a heterogeneous two-phase polymerization system is used wherein the polymerizable monomer is one phase dispersed usually as droplets in a second phase, usually water. The initiator is formed in situ at a pH of at least 7 and as high as 14 by adding one component of the initiator to the monomer phase and adding the other component of the initiator to the water phase. The two components are then brought together by the agitation of the droplets in the water phase to thereby form the initiator. A preferred initiator is a peroxydicarbonate formed from an alkyl haloformate contained essentially in the monomer phase and a peroxide concentrated in the water phase. The rate of polymerization varies with the concentration of the alkyl haloformate in the monomer phase.

It has now been discovered that a faster rate of polymerization can be achieved by causing the alkyl haloformate to be more highly concentrated in only a portion of the dispersed monomer phase. It has also been discovered that the same rate of reaction can be achieved as by means of a conventional in situ operation but using less alkyl haloformate when the alkyl haloformate is concentrated in only a portion of the dispersed monomer. By charging all of the alkyl haloformate in a small portion of the polymerizable monomer after the main portion of monomer is dispersed a higher concentration of the alkyl haloformate is formed in the monomer droplet. This higher concentration of alkyl haloformate in this small portion of polymerizable monomer results in a more rapid formation of the initiating species, since the alkyl haloformate concentration is a squared term in the rate equation for this reaction.

The following table illustrates conditions of polymerization that may be used in this invention.

TABLE I.—GENERAL AND PREFERRED CONDITIONS OF POLYMERIZATION

Ingredients, parts by weight:[1]
1. Polymerizable monomer ............................................. G=100.
   a. Vinyl chloride ................................................. G=51–100.
   b. Monomer copolymerizable with vinyl chloride ................... G=49–0.
2. Liquid reaction medium (water) to suit:
   a. Water .......................................................... G=50–1000. / P=150–200.
   b. Water-to-monomer ratio ........................................ G=.5:1 to 10:1. / P=1.50:1 to 2:1.
3. Dispersing agent, i.e. protective colloid ......................... G=.05 to 1.0. / P=.05 to .20.
   a. Hydroxypropyl methylcellulose ................................. P=.05 to .20.
   b. Polyvinyl pyrrolidone ......................................... G=([2]). / P=([3]).
   c. Polyvinyl alcohol ............................................. P=.05 to .25.
4. Free-radical initiator ............................................ G=.05 to .50.
   a. In situ:
      (1) Ethyl chloroformate ...................................... G=.01 to .5. / P=.06 to .1.
      (2) 50% $H_2O_2$ ............................................... G=.01 to .5. / P=.035 to .06.
      (3) Buffer (sodium bicarbonate) (to a pH of at least 7) ..... G=.01 to .5. / P=.16.

Conditions:
5. Temperature of polyerization (° C.) .............................. G=20–80. / P=35–65.
6. Reaction time (hours) ............................................ G=3–25 hours. / P=(to substantial completion.)
7. Conversion (percent) ............................................. G=60–98. / P=(to substantial completion.)
8. Agitation: Baffles and one propeller stirring downward, r.p.m. .. G=400 to 1,000. / P=450.
9. Pressure on polymerization system (in reactor), p.s.i. .......... G=at least equal to the vapor pressure of the reactants.

[1] Range.—G=General; P=Preferred.
[2] M.W.=30,000–300,000.
[3] M.W.=150,000–200,000.

The following example is illustrative of the present invention, all parts being by weight.

Example 1 (in situ)

Ingredients (parts used):

| | |
|---|---|
| Vinyl chloride | 100.0 |
| Ethyl chloroformate | 0.072 |
| 50% hydrogen peroxide | 0.045 |
| Sodium bicarbonate | 0.16 |
| Sodium salt of ethylene diamine tetraacetic acid | 0.05 |
| Methocel 60Hg-50 (hydroxypropyl cellulose) | 0.10 |
| Polyvinyl alcohol | 0.03 |
| Distilled water | 200.0 |
| Polymerization temperature, ° C. | 52 |
| Agitation, r.p.m. | 520 |
| pH (at start of reaction) | 8.5 |

All of the ethyl chloroformate is added to 10 parts of the vinyl chloride and this mixture is then added to the dispersion of the 90 parts of vinyl chloride in the water containing the other ingredients including the hydrogen peroxide. The dispersion is formed by agitating the mixture at 520 r.p.m. for 10 minutes. The reaction time to achieve a break in the reactor pressure from 104 p.s.i. to 70 p.s.i. was 5 hours and 20 minutes. It took 6 hours to achieve a break to the 70 p.s.i. reactor pressure when all of the ethyl chloroformate was added to all of the vinyl chloride at the start of polymerization.

Although the present invention is disclosed in connection with the polymerization of vinyl chloride, the process of the present invention is applicable with regard to the polymerization of any ethylenically unsaturated monomer which may be reacted to produce high molecular weight polymers or synthetic rubber in a polymerization reaction employing the present invention. Included are those unsaturated organic compounds which contain the structure $CH_2=C<$ and, in most cases, have at least one of the disconnected valences attached to an electronegative group, that is, a group which increases the polar character of the molecule, such as a chlorine atom or an organic group containing a double or triple bond such as vinyl, phenyl, nitrile, carboxy or the like.

Any free radical type initiator for the polymerization of ethylenically unsaturated monomer that can be formed in situ may be used including such initiators as di(dichloroacetyl) peroxide, diisopropyl peroxydicarbonate, diethyl peroxydicarbonate, di(trichloroacetyl) peroxide and acetyl benzoyl peroxide. In forming these initiators the corresponding acid halide is reacted in the water phase containing such water soluble initiator components as sodium perborate, potassium persulphate or hydrogen peroxide.

Any surface active agent may be used including emulsifiers and suspending agents such as gelatin, pectin, methyl cellulose, carboxymethyl cellulose, alginates, and soluble starch, gum acacia, gum tragon, agar-agar and tragacanth. Emulsifiers that may be used where the polymerization is carried out in an emulsion include the fatty acid soaps, the alkyl sulphates ($C_8$–$C_{18}$), alkyl sulfonates ($C_{12}$–$C_{16}$), sulfonated and sulphated mixed ethers, sulfonated and sulphated alkyl esters of fatty acids and sulfonated alkyl substituted amides of fatty acids. These agents may be used in amounts from .05 to 4 percent.

While certain representative embodiments and details have been shown for the purpose of illustrating the invention, it will be apparent to those skilled in this art that various changes and modifications may be made therein without departing from the spirit or scope of the invention.

What is claimed is:

1. In a process for the dispersion polymerization of a polymerizable ethylenically unsaturated monomer dispersed as droplets in an aqueous medium and polymerized in the presence of an in situ polymerization peroxydicarbonate initiator formed from an alkyl haloformate present in the monomer and a peroxide present in the aqueous medium at a pH of not less than 7, the improvement wherein all of the alkyl haloformate is present at the beginning of the polymerization in less than 10 percent and in more than .1 percent of the dispersed monomer.

2. The process of claim 1 wherein the monomer is vinyl chloride.

3. The process of claim 1 wherein the alkyl haloformate is ethyl chloroformate and the peroxide is hydrogen peroxide.

References Cited
UNITED STATES PATENTS

| | | | |
|---|---|---|---|
| 3,324,097 | 6/1967 | Pears | 260—92.8 |
| 3,575,945 | 4/1971 | Cantoni et al. | 260—92.8 W |
| 3,577,401 | 5/1971 | Smith | 260—92.8 W |
| 3,637,633 | 1/1972 | Dixon et al. | 260—92.8 W |

JOSEPH L. SCHOFER, Primary Examiner

A. HOLLER, Assistant Examiner

U.S. Cl. X.R.

260—88.7 D, 93.5 W, 94.1, 94.2 R, 95 R